(12) United States Patent
Sugata

(10) Patent No.: US 6,866,113 B2
(45) Date of Patent: Mar. 15, 2005

(54) FORKLIFT WITH TRANSVERSE TRAVEL SYSTEM

(75) Inventor: Takashi Sugata, Osaka (JP)

(73) Assignee: TCM Corporation, Osaka (JP)

( * ) Notice: Subject to any disclaimer, the term of this patent is extended or adjusted under 35 U.S.C. 154(b) by 217 days.

(21) Appl. No.: 10/343,392

(22) PCT Filed: Jun. 28, 2001

(86) PCT No.: PCT/JP01/05600
§ 371 (c)(1),
(2), (4) Date: Jan. 30, 2003

(87) PCT Pub. No.: WO02/10059
PCT Pub. Date: Feb. 7, 2002

(65) Prior Publication Data
US 2004/0007414 A1 Jan. 15, 2004

(30) Foreign Application Priority Data
Aug. 1, 2000 (JP) .................................... 2000-232536

(51) Int. Cl.⁷ ........................... B60K 17/30; B66F 9/08
(52) U.S. Cl. ..................... 180/253; 180/408; 180/411; 180/65.5
(58) Field of Search ............................. 180/65.1, 65.5, 180/252, 253, 408, 409, 411, 907, 908

(56) References Cited

U.S. PATENT DOCUMENTS

| 3,067,839 | A | * | 12/1962 | Gibson ........................ 180/253 |
| 3,463,506 | A | * | 8/1969 | Drake ......................... 180/409 |
| 4,823,899 | A |   | 4/1989 | Ron |
| 5,222,568 | A | * | 6/1993 | Higasa et al. ............... 180/65.5 |
| 5,727,644 | A | * | 3/1998 | Roberts et al. .............. 180/409 |
| 6,378,883 | B1 | * | 4/2002 | Epstein ....................... 180/65.5 |
| 6,732,831 | B2 | * | 5/2004 | Enmeiji et al. .............. 180/411 |
| 6,793,036 | B1 | * | 9/2004 | Enmeiji et al. .............. 180/411 |
| 2003/0029660 | A1 | * | 2/2003 | Higaki et al. ................ 180/252 |
| 2004/0007415 | A1 | * | 1/2004 | Kouyama .................... 180/411 |

FOREIGN PATENT DOCUMENTS

| GB | 2081196 | * | 2/1982 | ................ 180/65.5 |
| JP | 02-306879 A |   | 12/1990 | |
| JP | 05-246346 A |   | 9/1993 | |
| JP | 10-244951 A |   | 9/1998 | |
| WO | WO 90/11905 | * | 10/1990 | ................ 180/65.5 |

\* cited by examiner

*Primary Examiner*—Lesley D. Morris
*Assistant Examiner*—Matthew Luby
(74) *Attorney, Agent, or Firm*—D. Peter Hochberg; Sean Mellino; Katherine R. Vieyra

(57) ABSTRACT

A vehicle body (2) is provided with a pair of right and left front wheels (3) and a pair of right and left rear wheels (4), these wheels being adapted to be turned through 90 degrees. The front wheels (3) are attached to turning members (24) installed on the vehicle body (2) for turning around vertical axes (23), and turning means (40) are installed for turning the turning members (24). The front wheels (3) are operatively connected to travel drive means (30) respectively attached to the turning members (24). The travel drive means (30) extend rearward from the inner sides of the front wheels (3). Masts (6) are installed on the front end of the vehicle body (2), and forks (13) are installed on the masts (6). The front wheels are of the type in which they can be steered to turn sideways. And the travel drive means do not require the masts to be positioned more forwardly of the front wheels than necessary and the longitudinal balance can be satisfactorily maintained without increasing the self-weight.

2 Claims, 6 Drawing Sheets

(a)

(b)

(a)

(b)

FORKLIFT WITH TRANSVERSE TRAVEL SYSTEM

TECHNICAL FIELD

This invention relates to a forklift having a transverse travel system, which can be switched to a transverse travel mode.

BACKGROUND OF THE INVENTION

Conventionally, vehicles having a transverse travel system have been found among large size conveyance vehicles and some loaders, and reach style electric vehicles as forklifts. In addition, there exists a side forklift with a mast and forks installed sideways in relation to the movement direction of the vehicle to allow the vehicle to handle elongated objects. However, there are no counter balance type forklifts that can move sideways and function like a side forklift in addition to such tasks as generally required. To realize this type of forklift, the front wheels or driving wheels are required to be steerable sideways.

Therefore, a conventional forklift 1, shown in FIG. 8, has a pair of right and left front wheels 3 (driving wheels) in a front part of a vehicle body 2, a pair of right and left rear wheels 4 (steerable wheels) in a rear part, and a driver's seat 5 on an upper front part of the vehicle body 2. A mast 6 capable of vertically extending and retracting is located at the front end of the vehicle body 2 to be able to tilt in a front-and-rear direction through a front wheel axle 7 extending in the vehicle width direction. Additionally, tilt cylinders 8 enabling the mast 6 to tilt forward and backward are placed between the vehicle body 2 and the mast 6.

The mast 6 comprises a pair of right and left outer frames 9 and a pair of right and left inner frames 10 capable of vertical movement by being guided by the outer frames 9. Disposed between the outer frames 9 and the inner frames 10 is a lift cylinder 11. Additionally, lift brackets 12 capable of vertical movement by being guided on the inner frames 10 are provided, and a pair of right and left forks 13 are secured to the lift brackets 12 through a pair of upper and lower finger bars.

The above mentioned driver's seat 5 includes a seat 15, a steering wheel 16 located in front of the seat 15, and a headguard 19 disposed thereabove through front pipes 17 and rear pipes 18 which are erected on the vehicle body 2. Additionally, a counterweight 20 is located in the rear of the seat 15 on the vehicle body 2.

However, since the right and left frontwheels 3 are driven in common by a same travel drive system, the above mentioned conventional forklift 1 cannot effect straight-sideways steering of the front wheels, thus being unable to move laterally.

BRIEF SUMMARY OF THE INVENTION

The present invention has an object to provide a forklift with transverse travel system, in which front wheels and rear wheels can be steered straight sideways and the front-and-rear balance can be maintained properly.

A forklift with transverse travel system in this invention comprises a pair of right and left front wheels and a pair of right and left rearwheels respectively mounted to a vehicle body to be steerable by 90 degrees, the pair of right and left front wheels being connected to turning members capable of turning around vertical axes on the vehicle body, and means for allowing the turning members to rotate, wherein the pair of right and left front wheels are respectively connected to travel drive means attached to the turning members, these travel drive means being provided to extend rearward from the inner sides of the front wheels, and a mast is installed on the front end of the vehicle and forks are attached to this mast.

According to the above mentioned configuration, during normal travel, both the right and left front wheels and right and left rear wheels are steered either forward or backward. In this condition, a lift lever is then used to raise or lower the forks along the mast to accomplish expected fork operations.

When changing from a normal travel operation to a transverse travel operation, for example, a lever-style transverse travel mode switch is operated to activated a turning means. Therefore, operating the turning means allows the front wheels to turn around the vertical axes, enabling steering of the front wheels by 90 degrees (straight sideways) in relation to the vehicle, thus the forklift can travel laterally to the right or the left after the front wheels are steered straight sideways.

Additionally, when the front wheels are steered straight sideways, the travel drive means also turn integrally with the turning members and allow the inner width of portions of the travel drive means located along the inner sides of the front wheels to move closer to the rear side of the mast. At the same time, the width of the inner sides of the travel drive means, which extends from the inner faces of the portions located along the inner sides of the front wheels to the vertical axes, maybe formed narrow, so that projections extending forward from the vertical axes (or an interfering range with the mast) can be made narrower (smaller) corresponding to the inner side width of the travel drive means.

Consequently, in the system allowing the front wheels to steer straight sideways, it becomes unnecessary to install the mast so forward as unnecessary. That is to say, the mast may be installed in the same manner as in a conventional non-laterally traveling forklifts, so that the front-and-rear balance of the forklift can be maintained satisfactorily without increasing the self-weight of the forklift.

In a preferred embodiment of a forklift with transverse travel system according to the invention, in the configuration of the above mentioned claim 1, each of the travel drive means comprises a revolution drive unit located in the rear of the front wheel and a revolution transmission unit located along the inner side of the front wheel to transmit the action of the revolution drive unit to the front wheel.

According to this preferred embodiment, because of the reasons that a large shaped revolution drive unit can be positioned in the rear part of the front wheels and a thin type revolution transmission unit can be positioned inside the front wheels, the inner width of the travel drive means which extends from the vertical axes to the inner sides of the revolution transmission units can be narrowed.

PREFERRED EMBODIMENT

Figure 8:
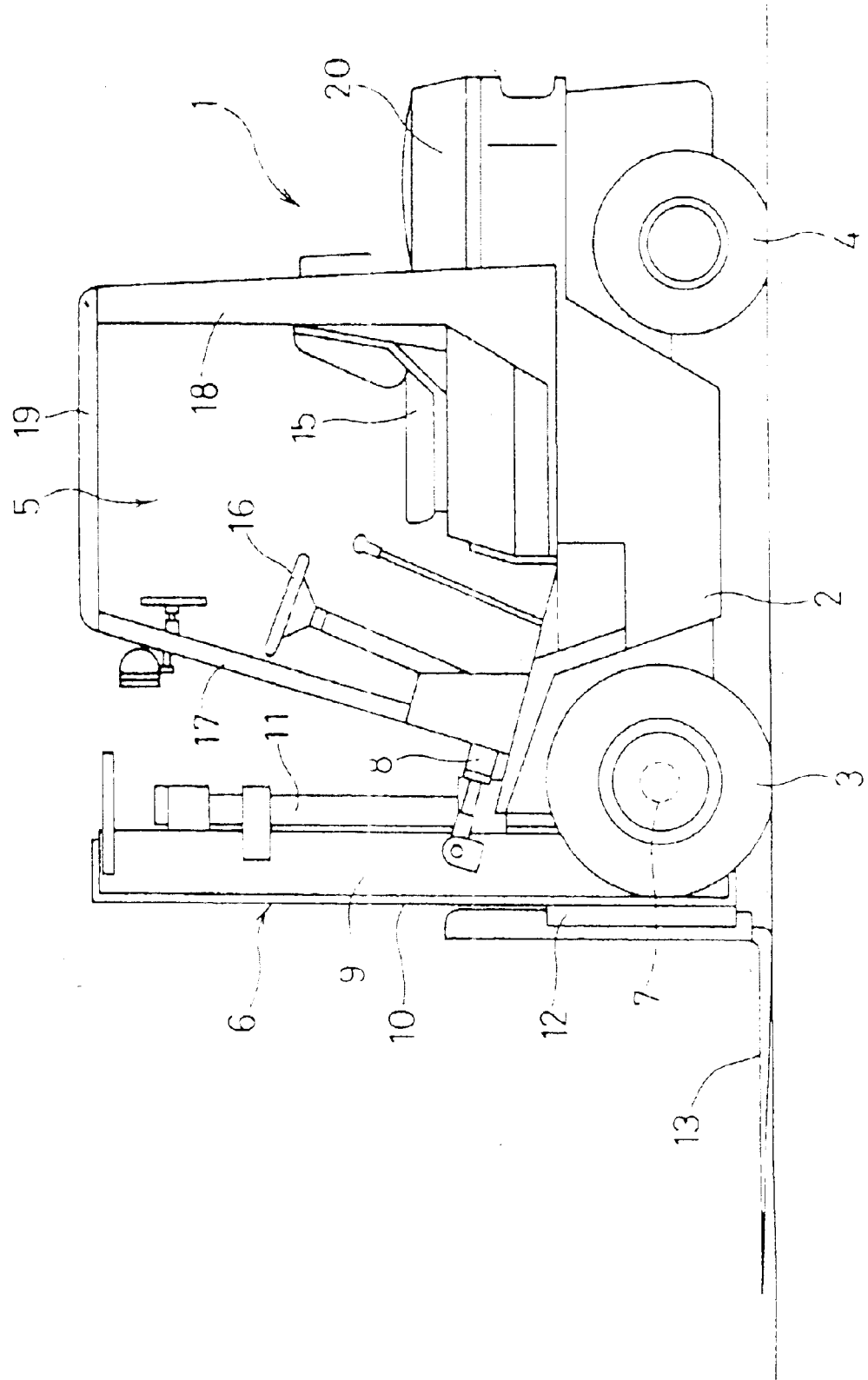
FIG. 8 is a side view of a forklift of a conventional art.

An embodiment of the present invention will be explained below using FIGS. 1 through 7. In these embodiments, components identical or almost identical to those of the conventional art (FIG. 8) are labeled with like reference symbols and detailed explanations thereof are omitted.

Reference symbol 1 shows a forklift, 2 a vehicle body, 3 a front wheel (drive wheel), 4 a rear wheel (steerable wheel), 5 a driver's seat, 6 a mast, 8 a tilt cylinder, 9 an outer frame, 10 an inner frame, 11 a lift cylinder, 12 a lift bracket, 13 a fork, 15 a seat, 16 a steering wheel, 17 a front pipe, 18 a rear pipe, 19 a headguard, and 20 a counterweight. The mast 6 is installed on the vehicle body 2 to be able to swing forward or backward through a linking axle 28 in the direction of the width of the vehicle.

Each of the pair of right and left front wheels 3 are mounted to be steerable by 90 degrees (steerable straight sideways) in relation to the vehicle body 2. That is, turning members 24 are attached to the vehicle body 2 to be able to turn around vertical axes 23 through bearings 21 and vertical axes 22. These turning members 24 are inverted L-letter shaped and their horizontal plates are connected to the lower ends of the vertical axes 22. Axles 26 are installed sideways on the vertical plates through bearings 25 to be able to turn, and rims 3A of the front wheels 3 are connected to these axles 26. The front wheels 3, at this time, are configured to be positioned almost immediately under the vertical axes 23.

Each of a pair of right and left front wheels 3 are attached to the turning member 24, connecting to a travel drive means 30, and this travel drive means 30 extends rearward from the inner sides of the front wheels 3 toward the rear direction. That is, electric motors 31 (an example of revolution drive unit) are located in the rear of the front wheels 3 and are secured with its output axis 32 facing inward on the turning members 24 through brackets 33.

Also, inside of the front wheels 3, a chain transmitting mechanism (an example of revolution transmission unit) 34 is placed to couple the output axis 32 of the electric motor 31 with the axle 26 of the front wheel 3. This chain transmitting mechanism 34 is comprised of a driving cogwheel 35 mounted on the output axis 32, a passive cogwheel 36 mounted on the axle 26, a chain 37 traveling between both cogwheels 35 and 36, a casing 38 and the like, and this casing 38 is secured to the turning member 24.

Because these large sized electric motors 31 are disposed in the rear of the front wheels 3, and a thin type chain transmission mechanism 34 is positioned inside of the front wheels 3, the inner width W of the travel drive means extending from vertical axes 23 to the inner sides of the chain transmission mechanism 34 can thereby be narrowly formed.

A front wheel turning means 40 to allow the previously mentioned turning members 24 to turn is installed on the above mentioned vehicle body 2. That is, the front wheel turning means 40 is comprised of a front wheel transverse travel cylinder 41 and this front wheel transverse travel cylinder 41 is mounted on the vehicle body 2 to allow its main body 41a to be able to move up and down through a vertical pin 42, and a piston rod 41b is connected to a link 43 which is secured to one of the turning members 24 to be able to turn relatively through a connecting pin 44 in the vertical direction. In addition, all parts that are configured between the right and left turning members 24 and the arm 45 are inter-connected and are able to turn relatively through a link 46 and a connecting pin 47.

Consequently, by operating the front wheel transverse travel cylinder 41, the turning member 24 is turned through the link 43, which enables one of the front wheels 3 to steer straight sideways around the vertical axis 23 and the other front wheel 3 to steer straight sideways around the vertical axis 23 through arm 45, link 46, and the like. That is, according to the front wheel turning means 40, by the operation of the common front wheel transverse travel cylinder 41, the right and left front wheels 3 are configured to steer in different directions that is to be steered straight sideways. The above mentioned items 41 through 47 and the like together form an example of the above mentioned front wheel turning means 40.

Each of a pair of right and left rear wheels 4 are mounted steerable by 90 degrees (steerable straight sideways) in relation to the vehicle body 2. That is, the pair of right and left rear wheels 4, with their rims 4A being mounted respectively on the vertical plate portion of the inverted L-letter shaped members 50 to be able to turn through an axle 51, and the like in a horizontal direction, and such. The horizontal plates on the turning members 50 are positioned to be able to turn around vertical axes 54 on the vehicle body 2. The rear wheels 4 at this time are configured to position almost immediately under the vertical axes 54.

A rear wheel turning means 60 to allow the pair of right and left rear wheels 4 to turn around the vertical axes 54 is installed and this rear wheel turning means 60 is comprised of a steering cylinder 61, a rear wheel transverse travel cylinder 63 and the like.

This means that the steering cylinder 61 with its main body 61a is positioned in the direction of the vehicle width, and a piston rod 61c connected to the piston 61b is protruding toward both sides in the direction of the vehicle width. Both ends of the projection of the piston rod 61c are secured to the vehicle body 2 through a supporting frame 62, thus the main body 61a is configured to be able to move in the direction of vehicle width.

The rear wheel transverse travel cylinder 63 exists as a right and left pair, and each of its main body 63a is integrated (connected) to the main body 61a of the previously mentioned steering cylinder 61 through a connecting member 64. At this time, each of the piston rods 63c connected to a piston 63b of the rear wheel transverse travel cylinder 63 is protruding outward in the direction of the vehicle width. In addition, an arm 65 is mounted on the upper end of the above mentioned vertical axis 53 and the protruding end of the piston rod 63 is connected to turn relatively through a link 66, connecting pins 67,68, and the like in the vertical direction.

According to above mentioned rear wheel turning means 60, the operation of the steering cylinder 61 is conducted by moving the main body 61a toward the secured piston rod 61c in the direction of the vehicle width, and then, the main body 63a of the rear wheel transverse travel cylinder 63 is moved integrally with the main body 61a of the steering cylinder 61 in the direction of the vehicle width. Meanwhile, inside the supporting frame, a guide (not, depicted in the drawing) penetrating a connecting member 64 is placed, and with this guide, the main bodies of 61a and 63a are provided with both moving guidance and rotation prevention.

The operation of the above mentioned steering cylinder 61 is configured to operate by an orbit roll (all hydraulic power steering) using the steering wheel 16. Additionally, the rear wheel transverse travel cylinders 63 are configured as a right and left pair, and are able to turn the rear wheels 4 respectively by actuating a control valve when the steering cylinder 61 is in neutral, and when the steering cylinder 61 is in operation, they are configured to be in a designated non-operational posture.

Therefore, by operating the rear transverse travel cylinders 63, the rear wheels 4 can be steered straight sideways with the vertical axes 53 being turned through the links 66, the arms 65, and the like. That is, by the operation of the rear transverse travel cylinders 63, right and left rear wheels 4 are configured to be steered in different directions that is steered straight sideways. By using the above mentioned 61 through 71 and the like, an example of the rear wheel turning means 60 will be able to turn a pair of right and left rear wheels 4 around the vertical axes 54 is configured.

A battery 75 is loaded on the above mentioned vehicle body 2, and a controller 76 is attached to this battery 75. Additionally, cable (power source supply part) 77 from this controller 76 is connected to each of the previously mentioned electric motors 31.

The following is an explanation of the operation of the above mentioned example.

Indicated by the solid lines in FIGS. 1(a), 2 through 6, and 7(a) are a normal travel time. At this time, the right and left front wheels 3 and the right and left rear wheels 4 are in the front-and-rear direction. The forklift 1 can be driven to travel by an operator sitting on the seat 15 of the driver's seat 5 by manipulating the steering wheel 16.

That is, the forklift 1 can move forward and backward by supplying electrical power from the battery 75 to the electric motors 31 by the cables 77 after controlling the electrical power with the controller 76, thereby to drive the front wheels in the front-and-rear direction through the chain transmission mechanism 34 and the like. Then, the revolution from the output axis 32 on the electric motor 31 can be transmitted to the front wheels 3 through the driving cogwheel 35, the chain 37, the passive cogwheel 36, and the axle 26.

Then, by operating a lifting lever to actuate the lift cylinders 11 to raise and or lower the forks 13 through the lift brackets 12 and the like along the mast 6, the expected fork operations can be executed. Further, by operating a tilting lever to actuate the tilt cylinders 8 to move the mast 6 around the linking axle 28 (that is to tilt), the postures of the forks 13 can be varied through the lift brackets 12 and the like.

During the traveling time mentioned previously, the steering is conducted by the manipulation of the steering wheel 16. Therefore, by turning the steering wheel 16 to the left side, the main body 61a of the steering cylinder 61 is operated toward the left side by the orbit roll 70, and through the connecting member 64, the main body 63a of both rear wheel traveling cylinders 63 is moved integrally to the left side. In the meantime, both rear wheel transverse travel cylinders 63 are playing a link-like role in the non-operational posture within the designated range of retraction. Therefore, the move of both of the rear wheel transverse travel cylinders 63 to the left side is transmitted to the arms 65 through the links 66 to allow the turning members 50 to turn around the vertical axes 54, and then to allow the rear wheels 4 to steer to the left.

Further, when both of the rear wheel transverse-travel cylinders 63 are retracted half way, as indicated by the virtual lines in FIG. 1(a) describing right and left rear wheels 4, both turning members 50 are turned around the, vertical axes 54 in different directions to be capable of steering diagonally so that the outer edges are located slightly forward, thereby the steering becomes possible in this position. Additionally, in the same manner as described above, for example, by turning the steering wheel 16 to the right, a right turn is possible.

Figure 1:
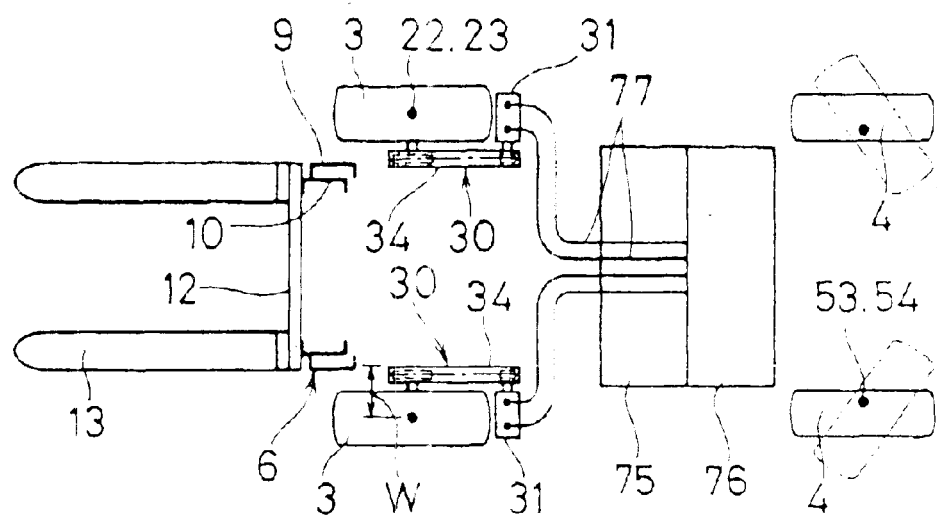
FIG. 1 is a schematic top view of a forklift with a transverse travel system according to an embodiment of the invention, emphasizing travel drive means, (a) showing a normal travel time and (b) showing a transverse travel time.
Figure 1:
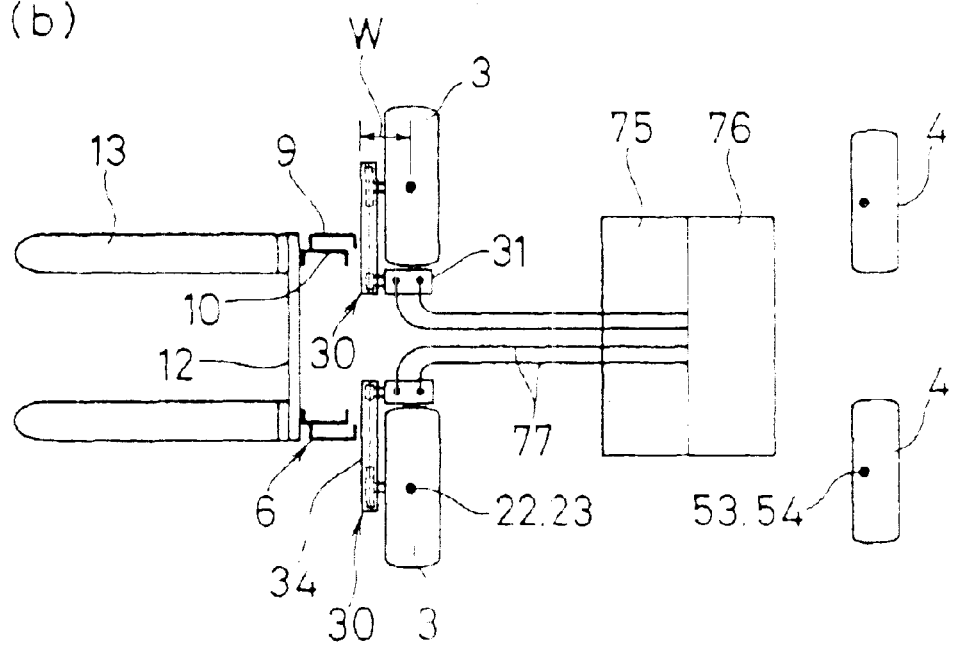
Figure 2:
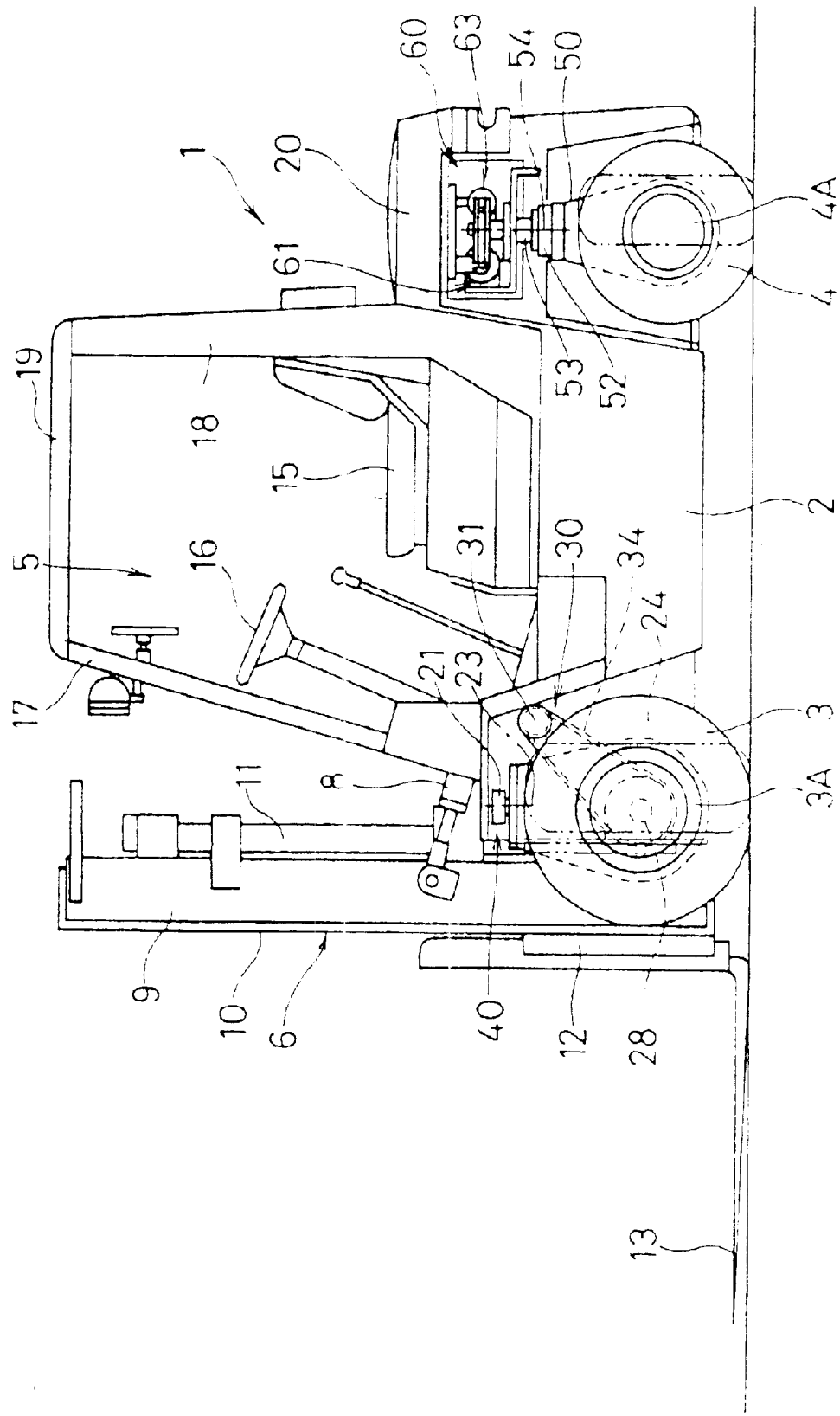
FIG. 2 is a side view of the forklift with a transverse travel system during the normal travel time.
Figure 3:
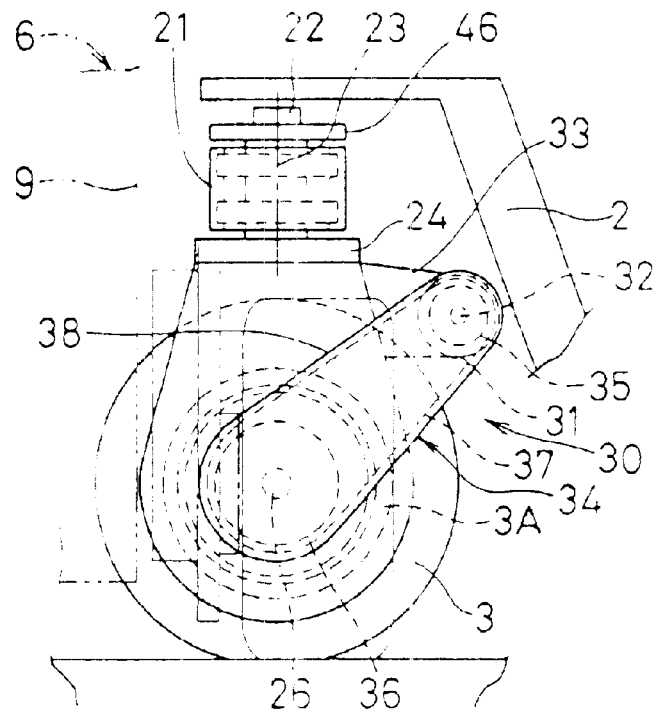
FIG. 3 is a side view of a front wheel portion of the forklift with a transverse travel system.
Figure 4:
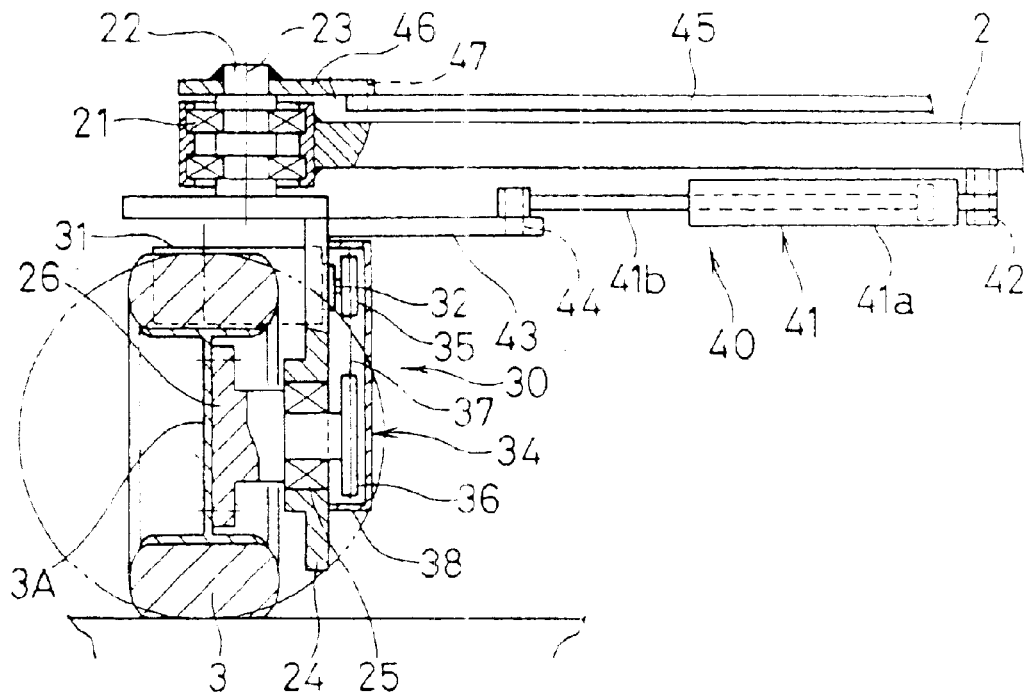
FIG. 4 is a partial cutaway front cross section of the front wheel portion of the forklift with a transverse travel system.
Figure 5:
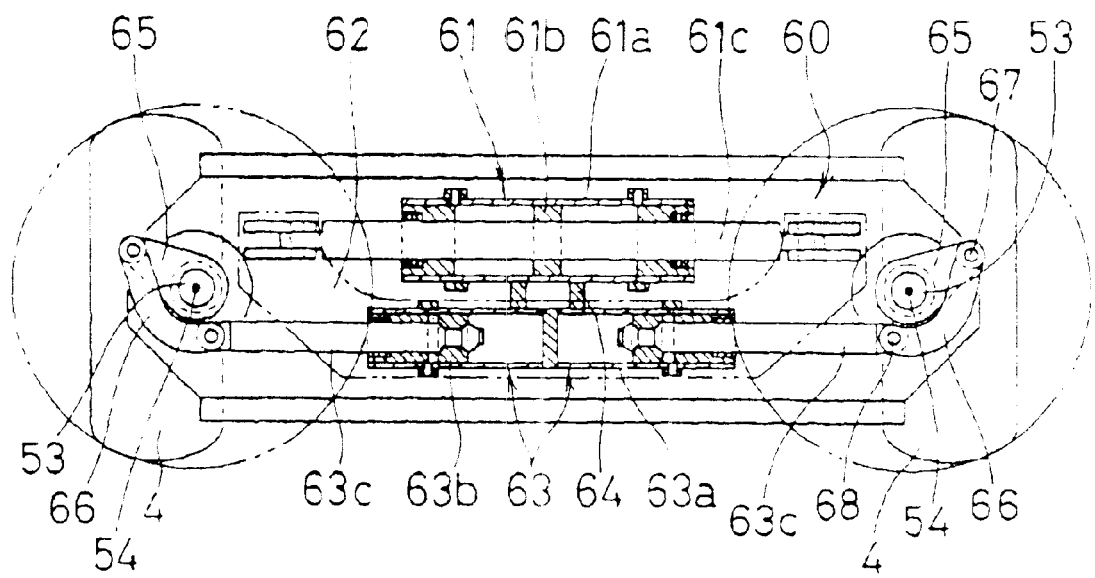
FIG. 5 is a partial cutaway top cross section of a rear wheel portion of the forklift with a transverse travel system.

When changing from a normal travel operation to a transverse travel operation, at first, the steering cylinder 61 is positioned in neutral (traveling straight forward) as shown in FIG. 5. With this condition, for example, a lever-style transverse travel mode switch (not depicted in the drawings) can be manipulated to actuate the front wheel turning means 40 and the rear wheel turning means 60.

That is, using the front wheel turning means 40, a lever style transverse travel mode stitch can be operated, to tilt, thereby to move the front transverse travel cylinder 41 which enables the turning member 24 to turn around the vertical axis 23 through the link 43. Thus, as indicated by the virtual lines shown in FIGS. 1(b), 3 and 4, and the FIG. 7(b), the front wheels 3 are steered by 90 degrees (straight-sideways) in relation to the vehicle body 2. The travel drive means 30 then also is turned integrally with the turning members 24 and each of the chain transmitting mechanism 34 is brought closer to the rear side of the outer frames 9. Since the front wheels 3 are positioned almost immediately under the vertical axis. 23, the front wheels 3 and the like can be made compact and steerable by 90 degrees.

Figure 6:
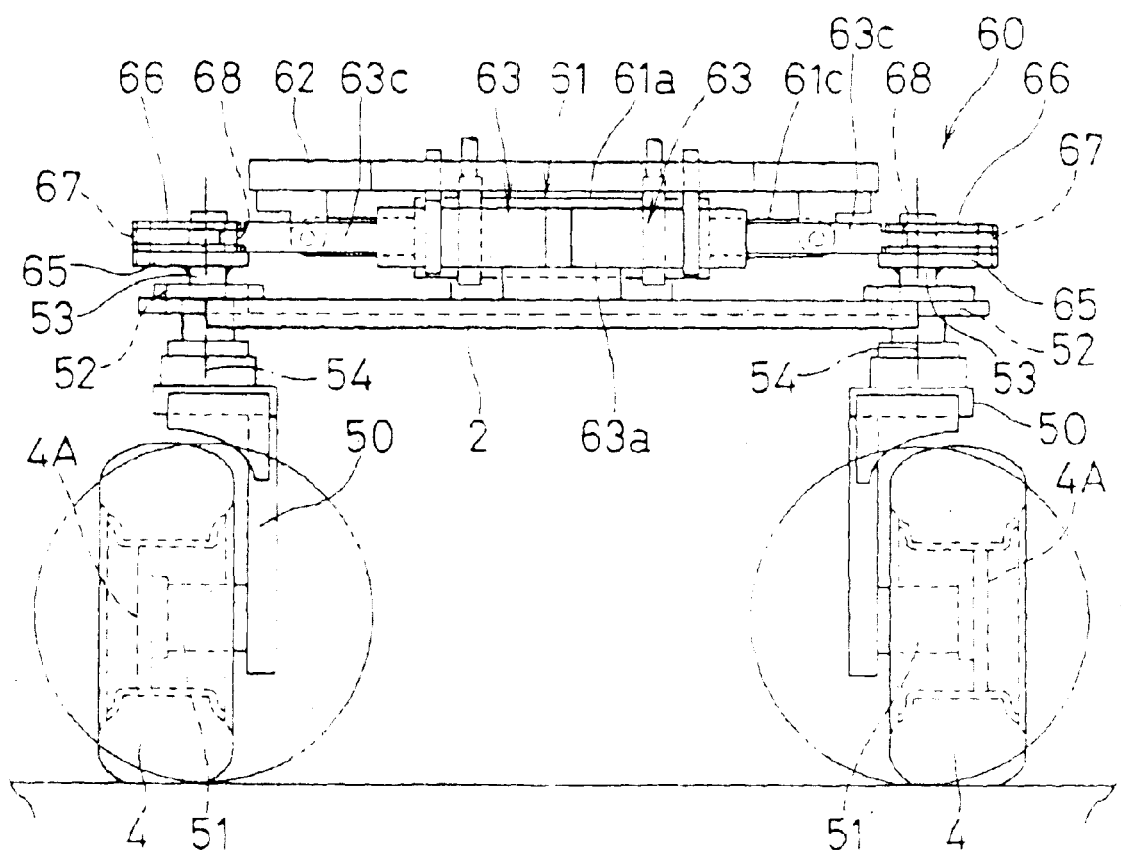
FIG. 6 is a rear view of the rear wheel portion of the forklift with a transverse travel system.
Figure 7:
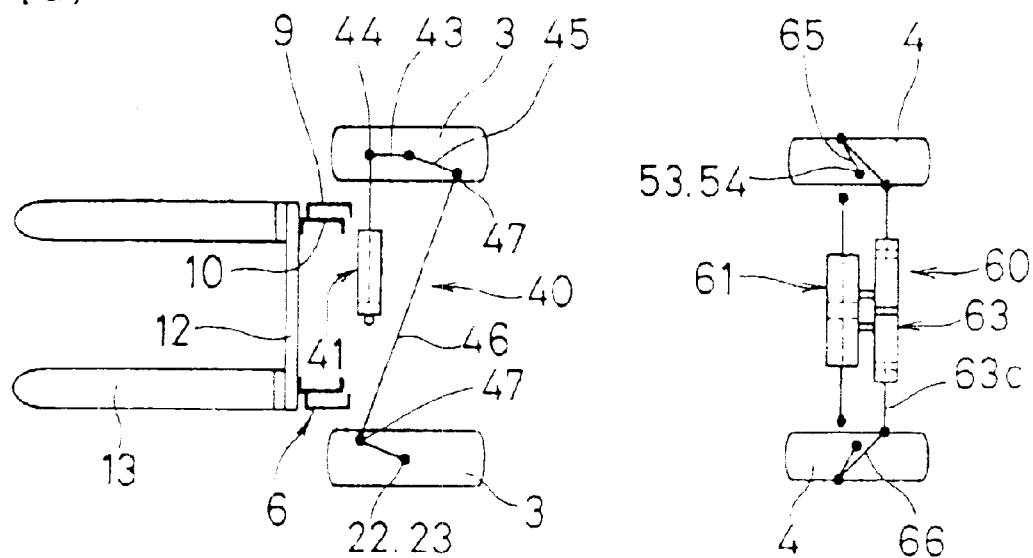
FIG. 7 is a schematic top view emphasizing turning means of the forklift with a transverse travel system, (a) showing the normal traveling time and (b) showing the transverse traveling time.
Figure 7:
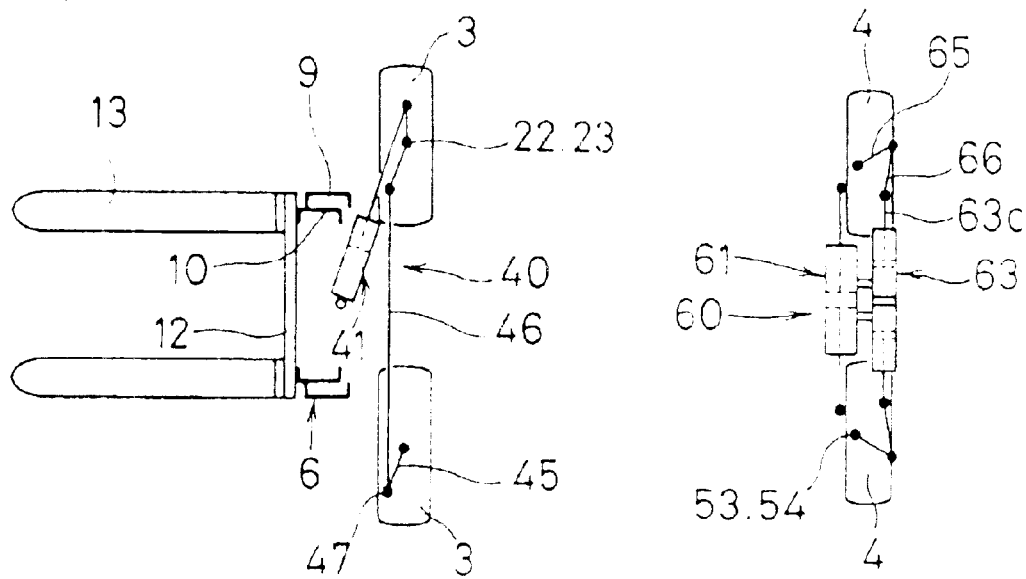

The rear wheel turning means 60 retracts both rear wheel transverse travel cylinders 63 by the control valve and then transmits the projecting movement of the piston rod 63c to the arms 65 through the links 66 for the turning members 50 to turn around the vertical axes 54, thus as indicated by the virtual lines of FIGS. 1(b) and 6, and by the FIG. 7(b), the rear wheels 4 can be steered by 90 degrees (straight sideways) in the relation to the vehicle body 2.

When the front wheels 3 and the rear wheels 4 are detected by a sensor as having changed the direction of travel or the front wheels 3 and the rear wheels 4 have been steered straight sideways, an indicator lamp is activated, thereby allowing the transverse travel mode to be affected.

Therefore, an operator of the forklift 1 sitting in the seat 15 of the driver's seat 5 can operate the steering wheel 16, and as explained above, can supply the electrical power from the battery 75 after being controlled by the controller 76 through the cables 77 to drive each electric motor 31, enabling the front wheels 3 to drive and turn in the front-and-rear direction through the chain transmitting mechanism 34 and the like to make the forklift 1 to travel laterally in either the right or the left direction. The pair of right and left rear wheels 4 at this time will follow the front wheels.

This transverse traveling capability will ease and facilitate, for example, the transporting of elongated objects with the forks 13. Correction of straightness in the transverse travel can be easily effected by tilting the lever forward or backward to slightly actuate the front wheel transverse travel cylinders 41 in order to allow for fine adjustment of the angle of the front wheels 3.

In the forklift 1 described above, this capability of forming a narrow inner width W of the travel drive means extending from the vertical axes 23 to the inner sides of the chain transmitting mechanism 34 is enabling the front wheels 3 to steer by 90 degrees in relation to the vehicle body 2 using the front wheel turning means 40, and when the travel drive means 30 is turned integrally to bring the chain transmitting mechanism closer to the rear side of the outer frames 9, the portion projecting forward from the vertical axis 23 (interfering range with the mast 6) becomes as narrow (small) as the previously mentioned inner width W of the travel drive means.

Because of this reason, although it is of a style that the front wheels 3 can be steered straight sideways, the mast 6 does not have to be positioned more forward than necessary in the relation to the front wheels 3 and the like due to the travel drive means 30, therefore, the mast 6 can be positioned in the same manners with the conventional non-lateral traveling forklifts. That is the reason that the balance of front and rear can be satisfactorily maintained without increasing the self-weight. Since the self-weight does not need to be increased, this saves the wasteful consumption of the battery 75.

Although the forklift 1 of a counter balance type is shown in the embodiment above, this can also be applied to the side forklifts and the like.

In the embodiment described above, the electric motors 31 are used as a revolution drive unit, however, this can also be hydraulic motors. To use the hydraulic motors, as a drive style of the forklift 1, 2-pump 2-motor type hydraulic drive system or 1-pump 2-motor type hydraulic drive system can be used.

In the above mentioned embodiment, a style utilizing the common means, the front wheel turning means 40 will allow the pair of right and left front wheels 3 to turn simultaneously as shown, however, there can be another style which can turn the pair of right and left front wheels 3 each separately by its own independent front wheel turning means.

Although the type having the rear wheel turning means 60 capable of rotating the pair of right and left rear wheels simultaneously is shown in the above mentioned embodiment, another style exists where one of the rear wheels of the pair of rear wheels 4 may be of a type capable of steering by means of a steering wheel, while the other wheel is of a follow-up castor type. In this case, when switching to a transverse travel mode, one of the rear wheels 4 is forcedly steered by the cylinder or the like. A castor style may also be used for both rear wheels 4.

What is claimed is:

1. A forklift with a transverse travel system, comprising:

a pair of right and left front wheels and a pair of right and left rear wheels respectively mounted to a vehicle body to be steerable by 90 degrees, the pair of right and left front wheels being connected to turning members provided on the vehicle body to be turnable around vertical axes;

means for allowing the turning members to rotate;

travel drive means installed in the turning members and connecting thereto the pair of right and left front wheels respectively, said travel drive means being located to extend rearward from the inner sides of the front wheels;

a mast positioned on a front end of the vehicle body; and forks installed on the mast.

2. The forklift with a transverse travel system according to claim 1, wherein each of the travel drive means comprises a revolution drive unit located in the rear of the front wheel, and a revolution transmitting unit located on the inner side of the front wheel to allow the revolution drive unit to be connected to the front wheel.

* * * * *